United States Patent
Ohara

(10) Patent No.: US 7,684,412 B2
(45) Date of Patent: Mar. 23, 2010

(54) DEVICE FOR COMMUNICATION AND PROGRAM USED FOR SUCH DEVICE

(75) Inventor: Kiyotaka Ohara, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 712 days.

(21) Appl. No.: 11/480,426

(22) Filed: Jul. 5, 2006

(65) Prior Publication Data

US 2007/0011354 A1    Jan. 11, 2007

(30) Foreign Application Priority Data

Jul. 5, 2005    (JP) .............................. 2005-196300

(51) Int. Cl.
H04L 12/56    (2006.01)
(52) U.S. Cl. .................. 370/395.54; 370/392
(58) Field of Classification Search ............ None
See application file for complete search history.

(56) References Cited

U.S. PATENT DOCUMENTS 5,434,974 A *    7/1995    Loucks et al. ........... 707/101

2004/0133675 A1    7/2004    Ishiyama et al.

FOREIGN PATENT DOCUMENTS

| EP | 0 918 412 A2 | 5/1999 |
| JP | 4-222041 | 8/1992 |
| JP | 11-316724 | 11/1999 |
| JP | 2003-348087 | 12/2003 |
| JP | 2004-128727 | 4/2004 |

OTHER PUBLICATIONS

Japanese Office Action, with English translation, issued in Japanese Patent Application No. JP 2005-196300, dated Sep. 16, 2008.

* cited by examiner

Primary Examiner—Jayanti K Patel
Assistant Examiner—Anthony Sol
(74) Attorney, Agent, or Firm—Scully, Scott, Murphy & Presser, P.C.

(57) ABSTRACT

There is provided a device connected to a network to which nodes are connected. The device is provided with a first storage unit in which information is registered, a request unit configured to transmit a request for device information concerning a name and an address of a node to the nodes, a reception unit configured to receive device information transmitted from the nodes as responses to the request, and a registration unit configured to register the device information received by the reception unit into the first storage unit.

5 Claims, 12 Drawing Sheets

```
127.0.0.1              localhost
134.152.234.12         BILPC
fe80::280:92ff.fe12:3456   PRN_1541C1
       •                      •
       •                      •
       •                      •
```

FIG.4A

```
127.0.0.1              localhost      A050010035601B
134.152.234.12         BILPC          A050010196301C
fe80::280:92ff.fe12:3456   PRN_1541C1   B050010054005A
       •                      •
       •                      •
       •                      •
```

FIG.4B

DEVICE FOR COMMUNICATION AND PROGRAM USED FOR SUCH DEVICE

CROSS-REFERENCE TO RELATED APPLICATION

This application claims priority under 35 U.S.C. §119 from Japanese Patent Application No. 2005-196300, filed on Jul. 5, 2005. The entire subject matter of the application is incorporated herein by reference.

FIELD

Aspects of the present invention relate to a terminal device having a function of performing name resolution.

BACKGROUND

In general, when a terminal device connected to a network is requested to access a node on the network by a node name, the terminal device converts the node name to an IP address so as to access the node using the IP address. Such conversion from a node name to an IP address is generally called "name resolution".

Various types of manners that enable a terminal device to achieve the name resolution have been proposed. In a typical example for the name resolution, a hosts file describing a relationship between each node name and its corresponding IP address is prepared in advance in each device, and in each device a requested node name is converted to an IP address by referring to the hosts file. Such name resolution has a drawback in that it needs a troublesome user operation for preparing a hosts file describing the relationship between each node and an IP address, and in that there is a possibility a user will make an inappropriate hosts file by mistake. In addition, if an address of a node is changed, a user needs to modify the hosts file to prevent the user's terminal device from becoming unable to access the node.

In a network system disclosed in Japanese Patent Provisional Publication No. HEI 04-222041 (hereafter, referred to as JP HEI04-222041A), addresses of terminal devices in a network are managed by a host computer and each terminal device stores a local hosts file describing addresses of the terminal devices in the network. In the system, the host computer makes a comparison between an address used for a target device by a terminal device with a corresponding address stored therein each time the terminal device starts to perform communication. A local hosts file stored in a terminal device is updated by the host computer if the terminal device uses an old address for data communication with another device.

The configuration of the network system disclosed in JP HEI04-222041A is able to eliminate the need for maintenance of a hosts file and to prevent the hosts files from inappropriately updated by a user's by mistake.

SUMMARY

An advantage of the present invention is a terminal device to eliminate the need for a dedicated device for name resolution and the need for a user operation for updating information used for name resolution.

BRIEF DESCRIPTION OF THE ACCOMPANYING DRAWINGS

FIG. 4A shows an example of an OS hosts file.

FIG. 4B shows an example of a dedicated hosts file.

DETAILED DESCRIPTION

General Overview

Figure 1:
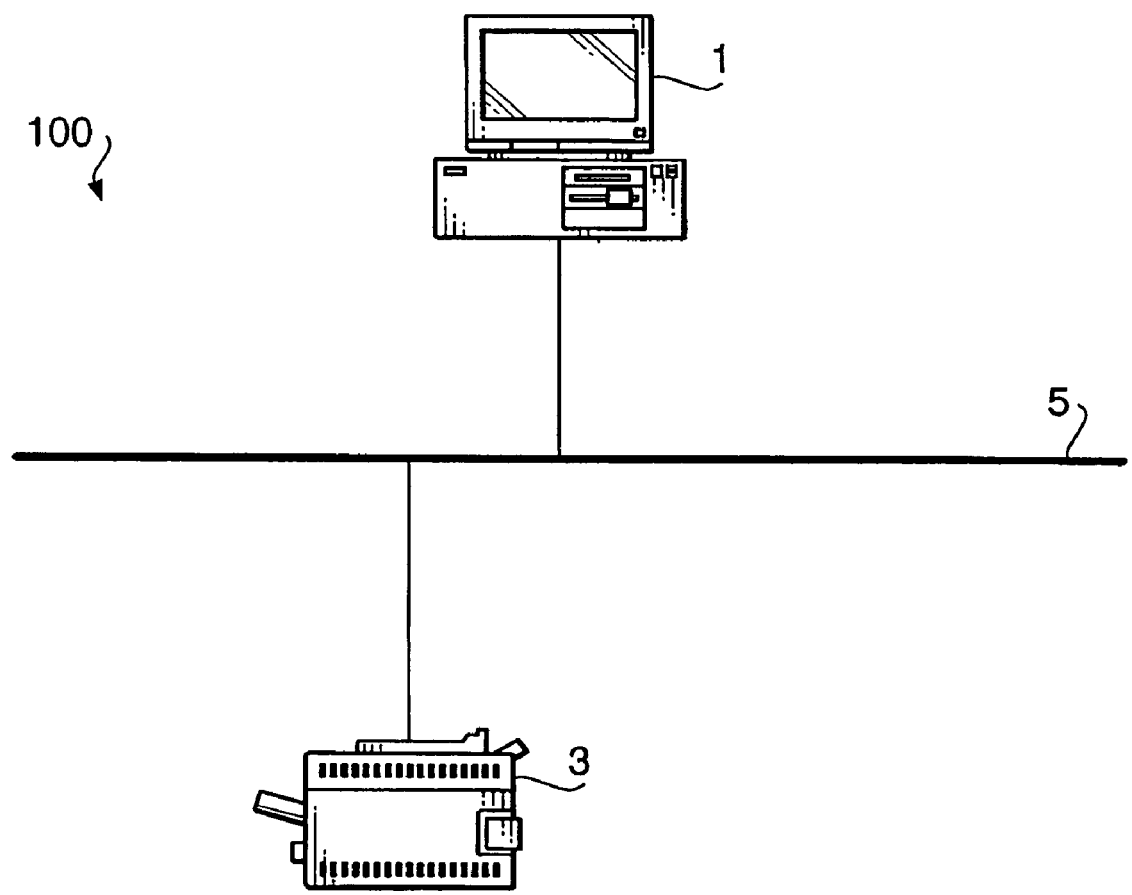
FIG. 1 illustrates a configuration of a network system according to an embodiment of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a device connected to a network to which nodes are connected. The device is provided with a first storage unit in which information is registered, a request unit to transmit a request for device information concerning a name and an address of a node to the nodes, a reception unit to receive device information transmitted from the nodes as responses to the request, and a registration unit to register the device information received by the reception unit into the first storage unit.

Such a configuration eliminates the need for a user operation for editing the first storage unit. There is no necessity to provide a management server holding a relationship between a node name and an IP address of each node within the network. Therefore, it is possible to reduce a load on the network in comparison with the case where information on the relationship is distributed from the management server to the nodes. Since the inventive device is able to perform name resolution by itself using the device information stored in the first storage unit, there is no necessity to provide a DNS server on the network. Since the need for preparing the management server or the DNS server is eliminated, the cost of the network system is decreased.

In at least one aspect of the invention, the request unit transmits the request to obtain an IP address and a node name of each node as the device information. In this case, the reception unit receives an IP address and a node name of each node as the device information.

In at least one aspect of the invention, the device includes a selection unit to select a piece of device information from among pieces of device information transmitted from the nodes. In this case, the registration unit registers the piece of device information into the first storage unit.

For example, the selection unit is configured to display a selection screen on which pieces of device information of nodes are listed, to request a user to select one of the pieces of information as a target to be registered in the first storage unit. Alternatively, the selection unit is configured to select a piece of device information in accordance with a predetermined selection condition. In this case, the selection unit can select a piece of device information of a node whose which node name is not registered in the first storage unit, or select a piece of device information if only one node responds to the request. The selection unit can adopt both the above mentioned user selection scheme and the selection scheme based on the predetermined selection condition. The selection unit can operate to preferentially select a piece of device information in accordance with the predetermined selection condition, and to request a user to select a piece of device information only if a piece of device information satisfying the predetermined selection condition is not found.

Since device information selected by the selection unit is registered in the first storage unit, it is possible to reduce the data quantity of the first storage unit, and thereby quickly perform name resolution using the first storage unit.

In at least one aspect of the invention, the device includes a name resolution unit to perform name resolution by converting a requested node name to its corresponding IP address referring to the first storage unit.

In at least one aspect of the invention, the device includes a checking unit to check whether a node having the IP address corresponding to the requested node name is actually found on the network before the name resolution unit performs the name resolution, and an update control unit to control the request unit and the reception unit to transmit the request, to receive the device information and to update the first storage unit with newly received device information if the node having the IP address corresponding to the requested node name is not found by the checking unit.

Since the presence of the node corresponding to the requested node name is checked by the checking unit, it is possible to prevent the name resolution being is performed and the first storage unit storing inappropriate device information. The update control unit updates the first storage unit only if the node having the IP address corresponding to the requested node name is found. That is, the number of transmission of broadcast or multicast packets can be reduced. Therefore, it is possible to reduce a load on the network in comparison with the case where the request by broadcast packet or multicast is issued without condition.

Since the first storage unit is updated by the update control unit, it is possible to perform the name resolution using appropriate device information.

In at least one aspect of the invention, the checking unit transmits a request for a response to the IP address corresponding to the requested node name, and judges whether a node having the IP address corresponding to the requested node name is actually found on the network in accordance with presence or absence of a response to the request for response returned from the IP address corresponding to the requested node name.

Such a configuration prevents the name resolution from being performed using invalid device information.

In at least one aspect of the invention, the checking unit transmits a request for a response containing a node name to the IP address corresponding to the requested node name, and judges whether a node having the IP address corresponding to the requested node name is actually found on the network by judging whether a node name contained in a response to the request for a response returned from the IP address corresponding to the requested node name is identical to the requested node name.

Such a configuration prevents the name resolution from being inappropriately performed in a network environment where IP addresses are dynamically assigned to the nodes. For example, if a first IP address which was assigned to a first node is newly assigned to a second node in such a network environment, the name resolution is not performed using the older information where the first IP address is assigned to the first node, but is performed appropriately using the latest device information where the first IP address is assigned to the second node. Using the update control unit, the first storage unit is appropriately updated. After the first storage unit is updated by the update control unit, the name resolution can be appropriately performed using the first storage unit. Therefore, it is possible to reduce a load on the network in comparison with the case where the request is transmitted by the request unit without condition.

In at least one aspect of the invention, the device includes a second storage unit in which information is registered. In this configuration, the checking unit transmits the request to obtain an IP address, a node name and identification information of each node as the device information, the reception unit receives an IP address, a node name and identification information of each node as the device information, and the registration unit registers an IP address and a node name obtained from each node in the first storage unit, and registers an IP address, a node name and identification information obtained from each node in the second storage unit. The checking unit transmits a request for a response containing a node name to the IP address corresponding to the requested node name, and judges that a node having the IP address corresponding to the requested node name is actually found on the network if a node name contained in a response to the request for a response returned from the IP address corresponding to the requested node name is identical with the requested node name, and identification information contained in the response returned from the IP address corresponding to the requested node name is identical with the identification information associated with the requested node name in the second storage unit. Further, the update control unit controls the request unit and the reception unit to transmit the request, to receive the device information and to update the second storage unit with the newly received IP address, node name and identification information of each node, in addition to updating the first storage unit, if the node having the IP address corresponding to the requested node name is not found by the checking unit.

Such a configuration prevents the name resolution from being inappropriately performed in a network environment where IP addresses are dynamically assigned to the nodes. For example, if a first IP address which was assigned to a first node is newly assigned to a second node in such a network environment, the name resolution is not performed using the older information where the first IP address is assigned to the first node, but is performed appropriately using the latest device information where the first IP address is assigned to the second node. By the update control unit, the second storage unit is appropriately updated. After the second storage unit is updated by the update control unit, the name resolution can be appropriately performed using the second storage unit. Therefore, it is possible to reduce a load on the network in comparison with the case where the request is transmitted by the request unit without condition.

In at least one aspect of the invention, the identification information is one of a MAC address and a serial number of each node.

In at least one aspect of the invention, the request unit transmits the request by one of broadcast and multicast.

In at least one aspect, the device stores an operating system and an application to be executed on the operating system. For executing the application which designates a node to communicate with the node, name resolution is performed using a relationship between a name and an address of each node stored in the first storage unit.

According to another aspect of the invention, there is provided a computer usable medium having computer readable instructions stored thereon, which, when executed by a computer, cause the computer to function as: a request unit to transmit a request for device information concerning a name and an address of a node to the nodes; a reception unit to receive the device information transmitted from the nodes as responses to the request; and a registration unit to register the device information received by the reception unit into a first storage unit.

Such a configuration eliminates the need for a user operation for editing the first storage unit. There is no necessity to provide a management server holding a relationship between a node name and an IP address of each node within the network. Therefore, it is possible to reduce a load on the network in comparison with the case where information on the relationship is distributed from the management server to the nodes. Since the computer is able to perform name resolution by itself using the device information stored in the first storage unit, there is no necessity to provide a DNS server on the network. Since the need for preparing the management server or the DNS server is eliminated, the cost of the network system is decreased.

In at least one aspect of the invention, the request unit transmits the request to obtain an IP address and a node name of each node as the device information. In this case, the reception unit receives an IP address and a node name of each node as the device information.

In at least one aspect of the invention, the request unit transmits the request by one of broadcast and multicast.

Illustrative Embodiments

Hereafter, an illustrative embodiment according to the invention will be described with reference to the accompanying drawings.

FIG. 1 illustrates a configuration of a network system 100 according to an embodiment of the invention. The network system 100 includes a PC (Personal Computer) 1 and a printer 3, which are connected to each other via a LAN (Local Area Network) 5. Although in FIG. 1 only one PC and one printer are illustrated, more than one personal computer having the same function as the PC 1 and more than one printer having the same function as the printer 3 may be provided in the network system 100. The LAN 5 includes relaying devices, such as a hub, and network cables (not shown).

Figure 2:
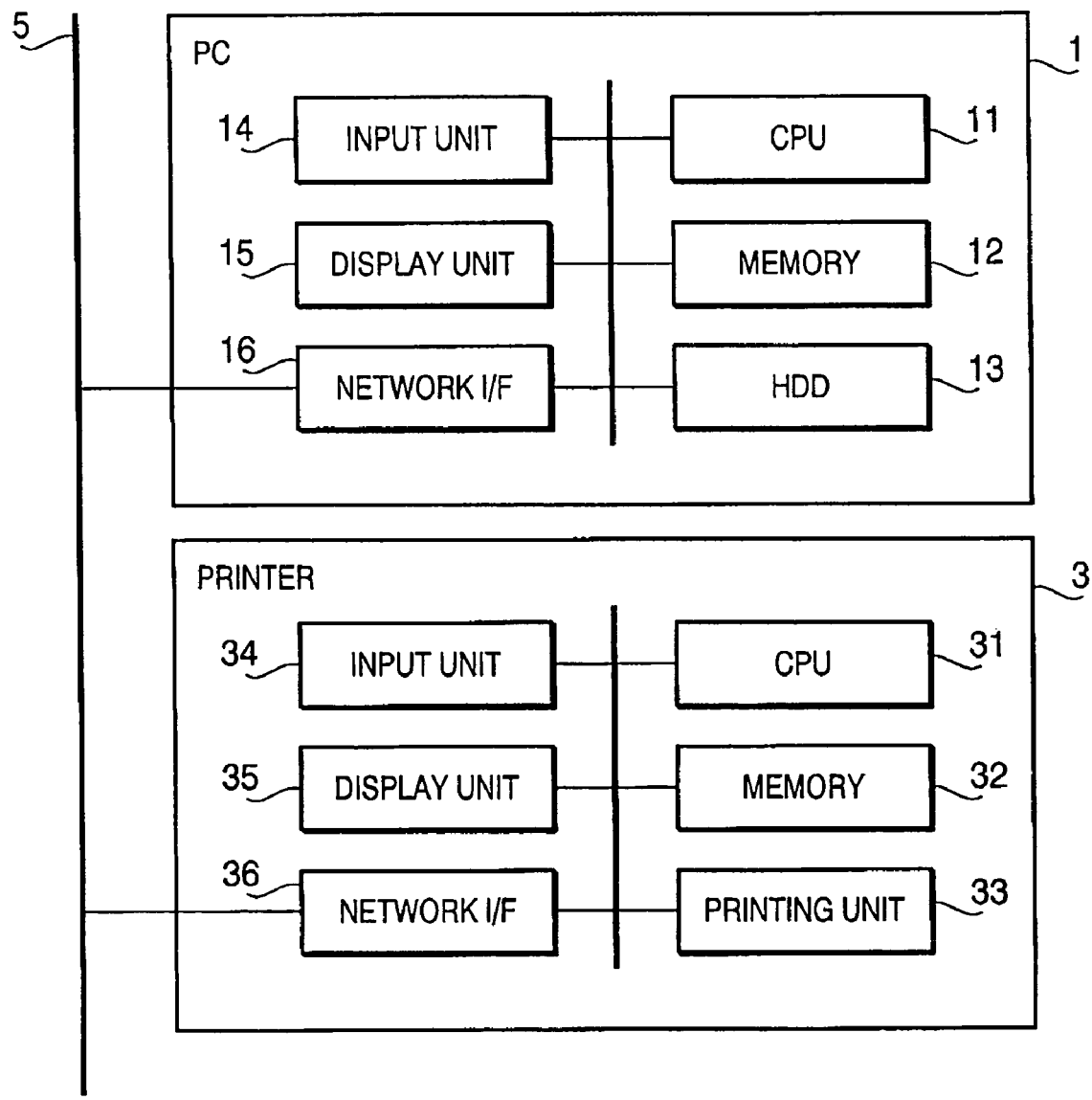
FIG. 2 illustrates a block diagram of each of a PC and a printer provided in the network system of FIG. 1.

FIG. 2 illustrates a block diagram of each of the PC 1 and the printer 3. The PC 1 includes a CPU 11, a memory 12, an HDD (Hard Disk Drive) 13, an input unit 14, a display unit 15 and a network interface 16. The CPU 11 controls internal components of the PC 1 in accordance with programs stored in the memory 12. The memory 12 may be provided with a ROM in which programs such as a BIOS (Basic Input Output System) is stored, a RAM (to which programs such as an Operating System or application programs are loaded) and a non-volatile RAM (in which various setting parameters are stored).

In the HDD 13, programs, such as an Operating System, application programs and various types of data are stored. The input unit 14 is a user interface device to be used by a user to input commands to the PC 1. The input unit 14 may include a keyboard and a pointing device (e.g., a mouse). The display unit 15 is, for example, an LCD, on which various types of information are displayed. The network interface 16 is configured to interface the PC 1 with other devices on the LAN 5. The network interface 16 is, for example, a NIC (Network Interface Card).

As shown in FIG. 2, the printer 3 includes a CPU 31, a memory 32, a printing unit 33, an input unit 34, a display unit 35 and a network interface 36. The CPU 31 controls internal components of the printer 3 in accordance with programs stored in the memory 32. The memory 32 includes, for example, a ROM, a RAM and a non-volatile RAM. The non-volatile RAM of the memory 32 stores an MIB (Management Information Base) used for SNMP (Simple Network Management Protocol). In the MIB, device information including a node name, an IP address, a MAC (Media Access Control) address and a serial number of the printer 3 is stored. The printer 3 provides the device information for the PC 1 in response to a data acquisition request transmitted from the PC by SNMP.

The printing unit 33 includes a sheet carrying unit configured to carry a recording medium (e.g., a sheet), and an image forming unit configured to form an image on a recording medium. The CPU 31 controls the sheet carrying unit and the image forming unit so that an image is formed on a recording medium. The input unit 34 is configured to be used by a user to input various types of commands to the printer 3. The input unit 34 is, for example, an operation panel having keys. The display unit 35 is, for example, an LCD, on which various types of information are displayed. The network interface 36 is configured to interface the printer 3 with other devices on the LAN 5. The network interface 36 includes, for example, a NIC (Network Interface Card).

Figure 3:
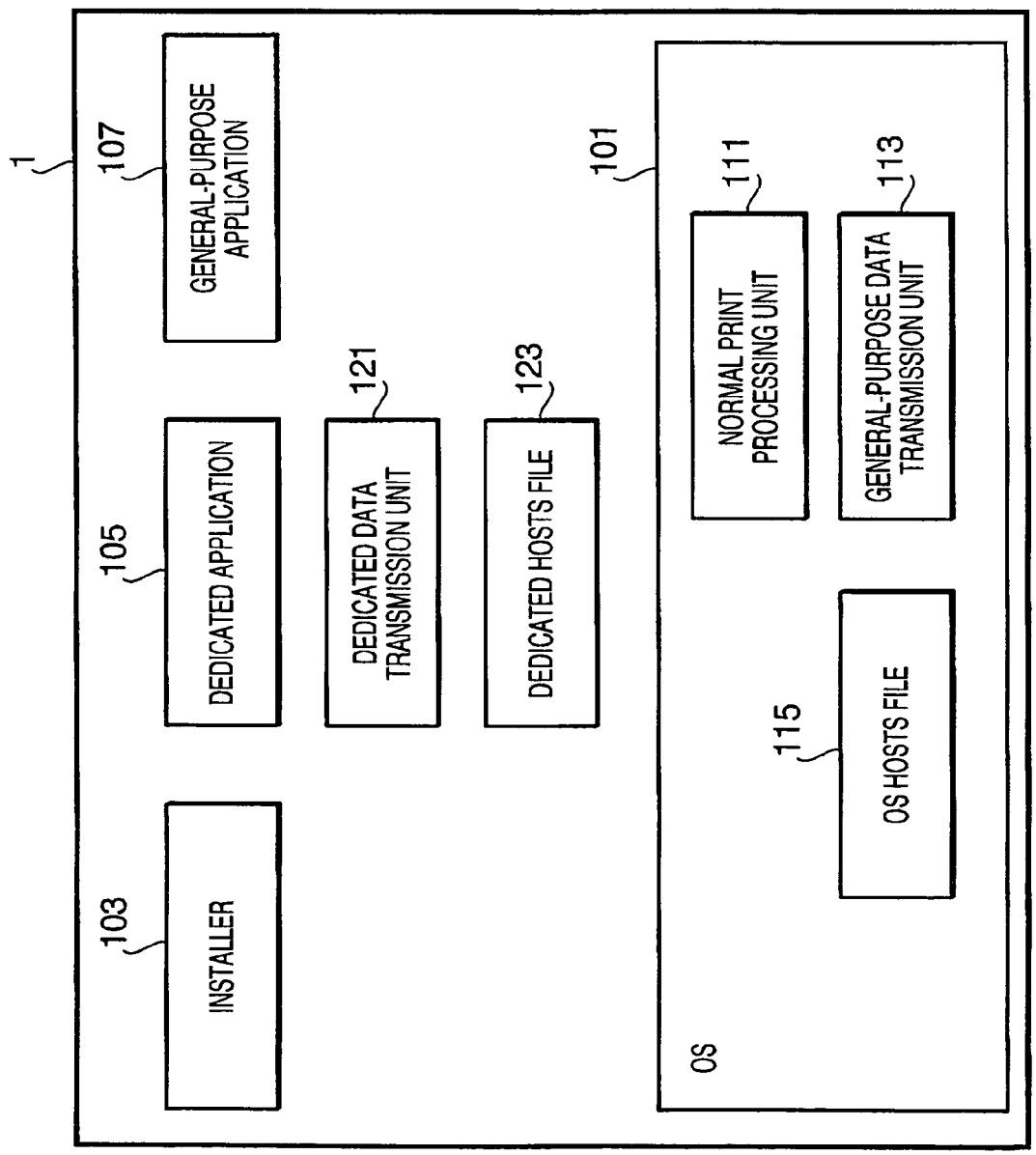
FIG. 3 illustrates a software and data structure concerning a printing function running on the PC of FIG. 1.

FIG. 3 illustrates a software and data structure concerning the printing function running on the PC 1. When the PC 1 is turned to ON, the PC 1 starts up an OS (Operating System) 101, and then moves to a state of allowing applications to run under control of the OS 101. In this embodiment, an installer 103, a dedicated application 105, and a general-purpose application 107 are executable on the PC 1 as applications.

The OS 101 is configured as a multi-task OS having the multi task function of allowing two or more programs to run concurrently by time division control as well as having the basic input and output function and memory management function. The OS 101 also has a multi-window function of displaying two or more display windows concurrently on the display unit 15. For example, Windows®, or MacOS® may be employed as the OS 101.

In the OS 101, various types of functional units of software such as a normal print processing unit 111 which provides a printing function, and a general-purpose data transmission unit 113 which provides a data transmission function of transmitting data to a device (e.g., the printer 3) via the LAN 5 are running.

The normal print processing unit 111 includes a printer driver and a spooler. When print data is generated, for example, by an application program, the print data is passed to the normal print processing unit 111, and then the normal print processing unit 111 processes the print data, for example, by processing the print data in accordance with information representing the type of the printer 3 or managing the print data as one of print jobs arranged in a predetermined order and sending the print data to the general-purpose data transmission unit 113.

The general-purpose data transmission unit 113 includes a port monitor, and having the function of performing name resolution referring to a hosts file 115 of the OS 101 and executing a data transmission process for transmitting data to the LAN 5. The hosts file 115 of the OS 101 (hereafter, referred to as an OS hosts file 115) may be a standard file which is prepared in advance for achieving a network management function of the OS 101. FIG. 4A shows an example of the OS hosts file 115. As shown in FIG. 4A, the OS hosts file 115 is formed as a text file defining a relationship between each IP address and its corresponding node name.

When print data is passed to the general-purpose data transmission unit 113 via the normal print processing unit 111, the general-purpose data transmission unit 113 searches the OS hosts file 115 for a node name contained in the print data and transmits a packet containing the print data to an IP address which is associated with the searched node name.

Hereafter, application programs running on the PC 1 are described. As described above, the installer 103, the dedicated application 105 and the general-purpose application 107 are software running on the PC 1 under control of the OS 101.

The installer 103 has the function of installing various types of software (e.g., a printer driver or a status monitor) into the PC 1. The installer 103 runs on the PC 1 at least one time for enabling the PC 1 to use the printer 3. By the execution of the installer 103, the PC 1 is able to establish settings for the printer 3. The program of the installer 103 is stored, for example, in a removal medium (e.g., a CD-ROM) attached as an accessory to the printer 3, and when the removal medium is mounted on the PC 1, the program is automatically loaded into the memory 12 of the PC 1. The installer 103 may be downloaded from a web site. If the installer 103 is downloaded from a web site, a user conducts a user operation for starting the downloaded installer 103 through the input unit 14 so that the installer 103 is loaded into the memory 11 and the installer 103 is initiated.

The dedicated application 105 has the function of transmitting print data to the printer 3 through a dedicated data transmission unit 121, without using the normal print processing unit 111 and the general-purpose data transmission unit 113 in the OS 101. The dedicated data transmission unit 121 used by the dedicated application 105 is installed into the PC 1 together with the dedicated application 105. The dedicated data transmission unit 121 has the function equivalent to that of the general-purpose data transmission unit 113.

More specifically, when the dedicated application 105 executes a printing function, print data is passed to the dedicated data transmission unit 121 and then the dedicated data transmission unit 121 performs the name resolution referring to a dedicated hosts file 123 and transmits the print data to the LAN 5. The dedicated hosts file 123 is a file different from the OS hosts file 115. FIG. 4B shows an example of the dedicated hosts file 123. As shown in FIG. 4B, the dedicated hosts file 123 is a text file defining a relationship between each node name, its corresponding IP address and identification information (e.g., a serial number of a device). By preparing the dedicated hosts file 123, the PC 1 is able to cause the dedicated application 105 to appropriately perform the printing function while performing the name resolution through use of the dedicated data transmission unit 121 in the event of an accident where the OS hosts file 115 is damaged.

The general-purpose application 107 has the function of transmitting print data to the printer 3 through the normal print processing unit 111 and the general-purpose data transmission unit 113 provided by the OS 101.

Hereafter, an operation of the installer 103 is explained with reference to FIG. 5. It should be noted that although the installer 103 has the function of installing software into the PC 1, only a principal function of the installer 103 is illustrated in FIG. 5.

Figure 5:
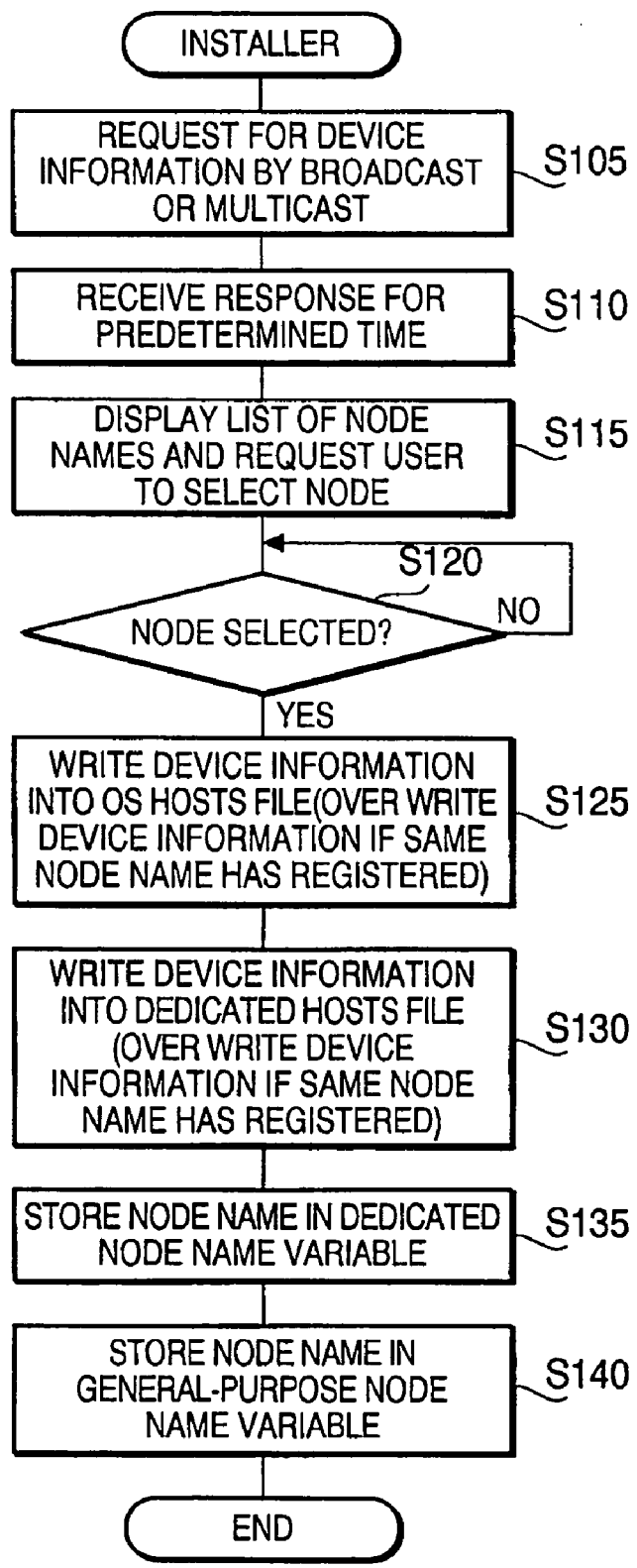
FIG. 5 is a flowchart illustrating an operation of an installer.

When an installer process shown in FIG. 5 is initiated, the installer 103 sends out a request for device information by broadcast or multicast (step S105). Then, the installer 103 waits for a response from the printer 3 for a predetermined time (step S110). The device information requested by the installer 103 includes a node name, an IP address, and identification information of the printer 3. If a response to the request is returned from the printer 3, the installer 103 receives the response in step S10. If two or more devices are provided in the network system 100, the installer 103 receives two or more responses from these devices in step S110.

Figure 6:
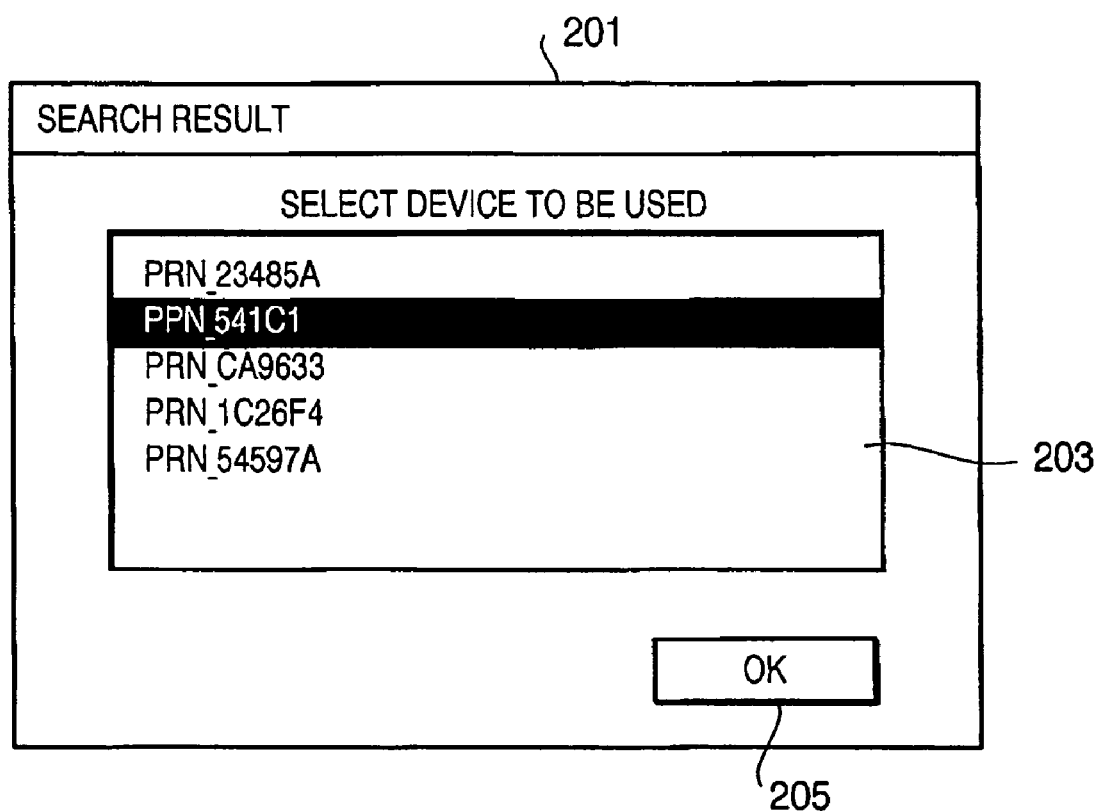
FIG. 6 shows an example of a search result window displayed by the installer.

Next, the installer 103 displays a list of node names so as to request a user to select a node from among the displayed nodes (step S115). More specifically, in step S115, the installer 103 displays a search result window 201 as shown in FIG. 6 on the display unit 15. As shown in FIG. 6, the search result window 201 includes a node name list field 203 and an OK button 205. More than one node of which response is received in step S110 is displayed in the node name list field 203. The user selects one of nodes displayed in the node name list field 203, for example, by clicking on a node using a pointing device or by moving a cursor for which inverse display is applied using a cursor key of a keyboard, so that a selection of the user is confirmed.

Then, the installer 103 checks whether a node name is selected by the user by judging whether the OK button 205 is pressed (step S120). The installer 103 waits until a node name is selected (S120: NO). If a node name is selected (S120: YES), the installer 103 writes the device information into the OS hosts file 115 (step S125), and writes the device information into the dedicated hosts file 123 (step S130).

In step S125, the selected node name and its corresponding IP address (which is obtained in step S110 together with the node name) are written into the OS hosts file 115 as the device information. In step S130, the selected node name, its corresponding IP address (which is obtained in step S110 together with the node name) and identification information (which is obtained in step S110 together with the node name) are written into the dedicated hosts file 123. If a node name equal to the selected node name to be newly written into the hosts file 115 or 123 is already registered in the hosts file 115 or 123, the data corresponding to the node name is overwritten by the device information of the selected node name. With this configuration, the latest IP address information can be reflected in the hosts files 115 and 123 in a network environment where IP addresses are dynamically assigned to devices.

After writing device information into the hosts files 115 and 123, the installer 103 stores the node name into a dedicated node name variable (step S135). Then, the installer 103 stores the node name into a general-purpose node name variable (step S140). Then, the installer process terminates.

The dedicated node name variable is used to store a node name of a target printer from the dedicated application 105. When the dedicated application 105 executes the printing operation, a node name read from the dedicated node name variable is displayed as a target printer from the dedicated application 105. The general-purpose node name variable is used to store a node name of a target printer from the general-purpose application 107. When the general-purpose application 107 executes the printing operation, a node name read from the general-purpose node name variable is displayed as a target printer from the general-purpose application 107.

As described above, in the PC 1, the device information of the printer 3 is registered in the OS hosts file 115 and the dedicated hosts file 123 by the installer 103. By installing software into the PC 1 through the installer 103, device information is registered in the OS hosts file 115 and the dedicated hosts file 123 in conjunction with the installing operation, without requesting the user to perform a troublesome user operation for registering device information into the OS hosts file 115 and the dedicated hosts file 123. Such a configuration makes it possible to perform the name resolution using the OS hosts file 115 or the dedicated hosts file 123 without providing a dedicated server, such as a DNS server, on the network system 100.

Although there is a possibility that more than one device will return a response to the PC 1 in step S110, the device information of a single node selected by the user in step S115 is registered in the OS hosts file 115 and the dedicated hosts file 123. Therefore, it is possible to prevent an excessively large amount of information from being registered in the hosts files 115 and 123. Consequently, it is possible to quickly derive information from the hosts file 115 or 123 in comparison with the case where a large amount of information is registered in the hosts file 115 or 123.

Figure 7:
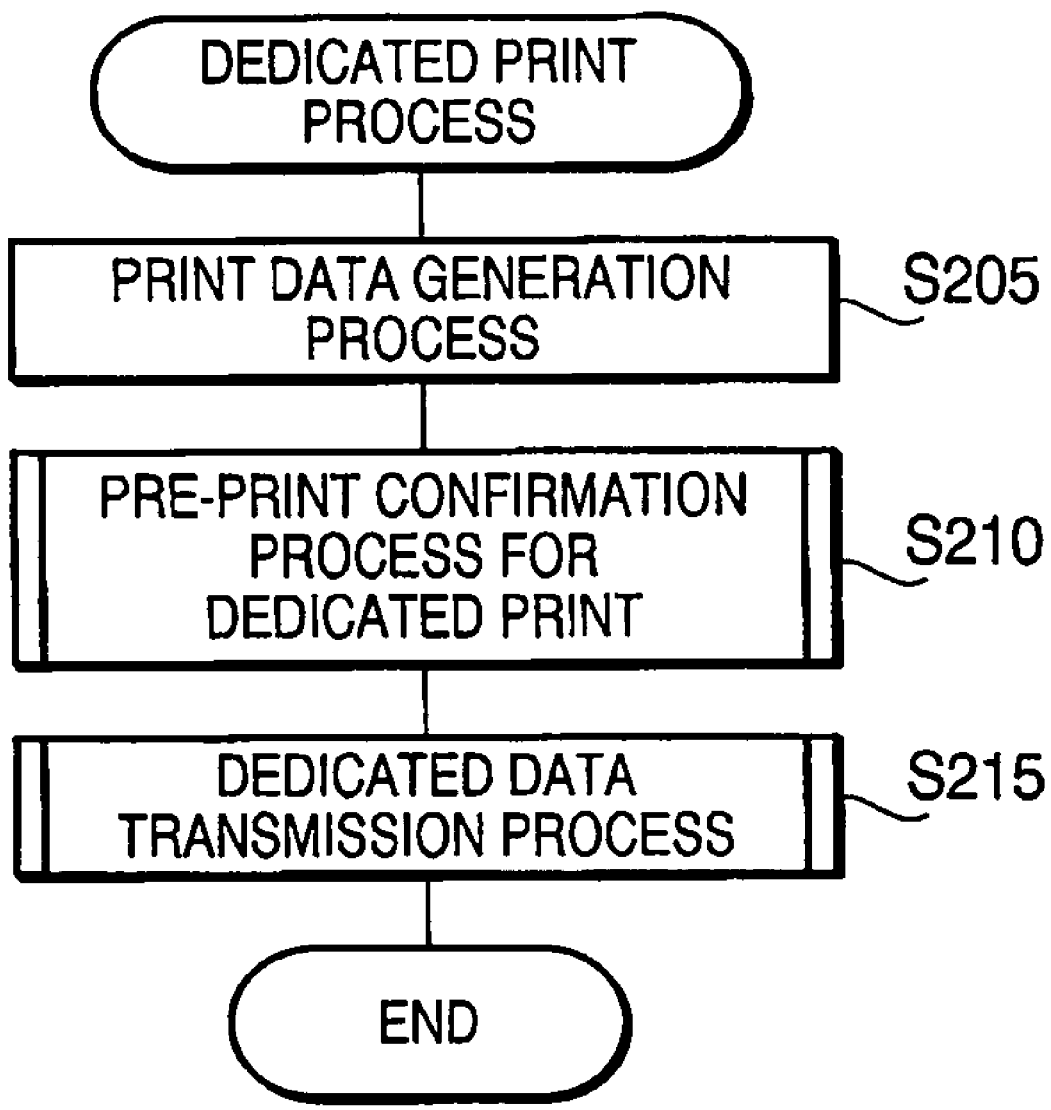
FIG. 7 is a flowchart illustrating a dedicated print process.

Hereafter, a dedicated print process performed by the dedicated application 105 and the dedicated data transmission unit 121 is described with reference to FIGS. 7 to 9. The dedicated print process shown in FIGS. 7 to 9 is performed under cooperation between the dedicated application 105 and the dedicated data transmission unit 121.

When the dedicated print process is initiated, the dedicated application 105 executes a print data generation process to generate print data (step S205). Then, the dedicated application 105 executes a pre-print confirmation process for dedicated print in step S210.

Figure 8:
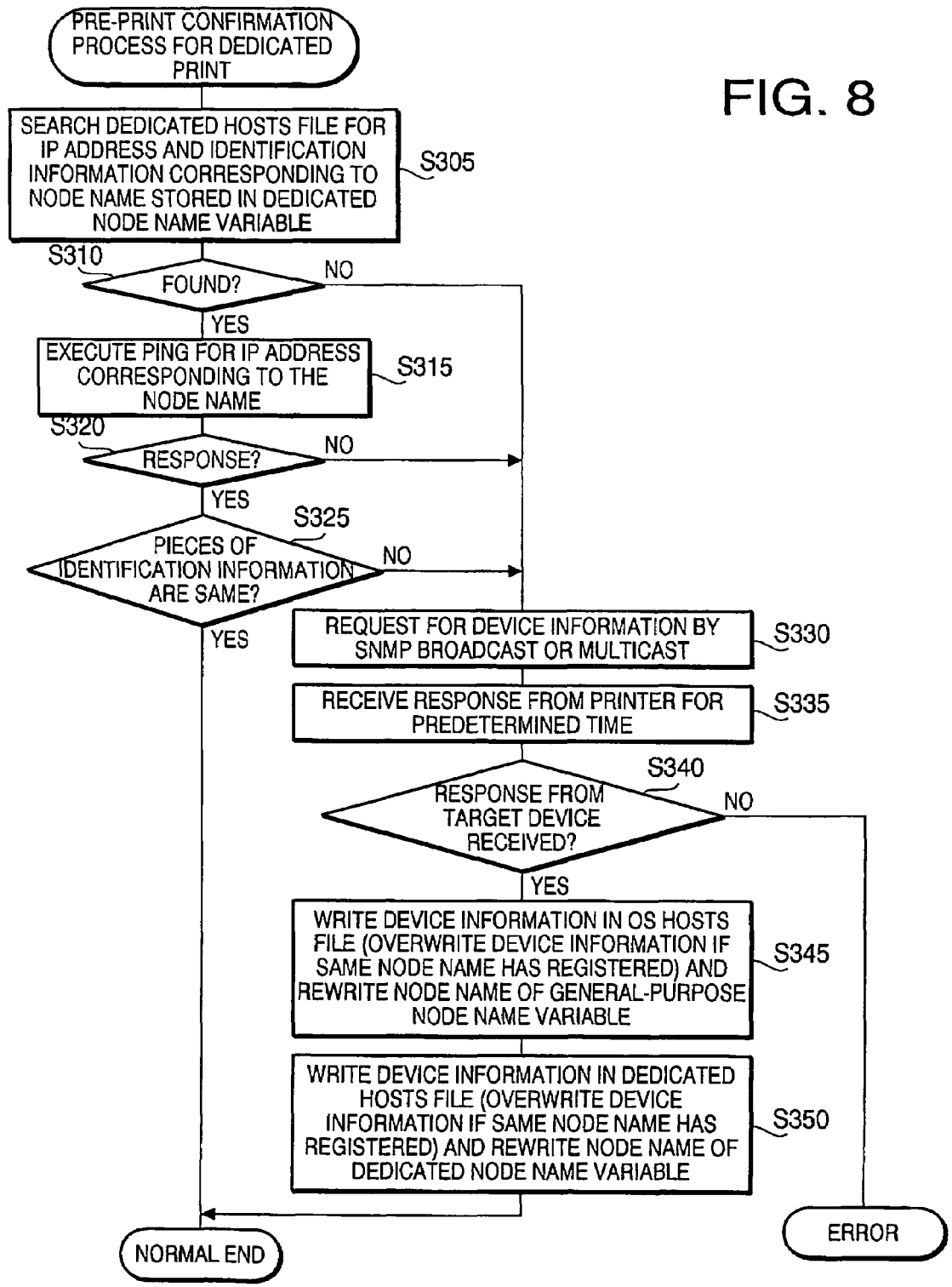
FIG. 8 is a flowchart illustrating a pre-print confirmation process for dedicated print.
Figure 9:
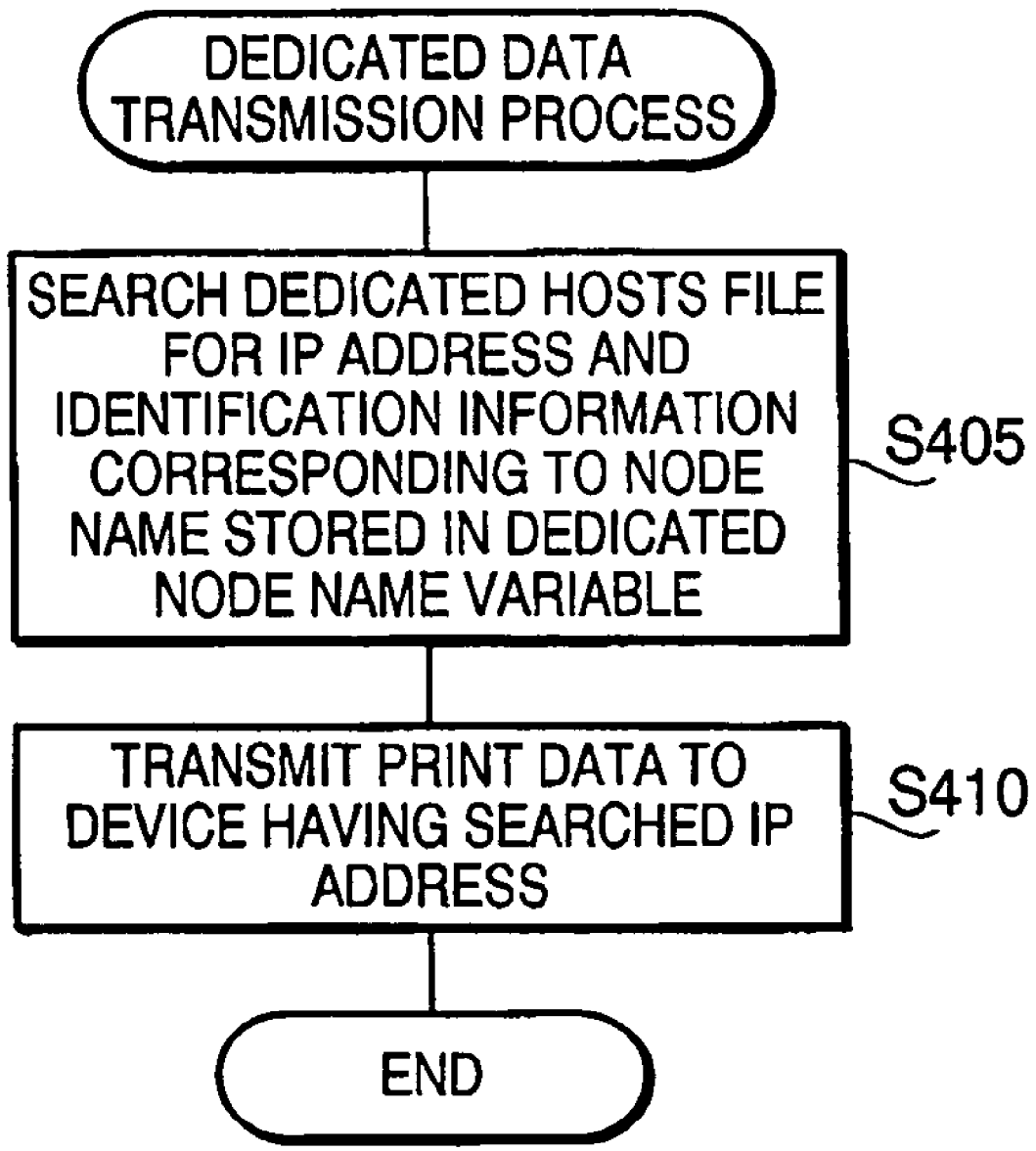
FIG. 9 is a flowchart illustrating a dedicated data transmission process.

FIG. 8 is a flowchart illustrating the pre-print confirmation process for dedicated print. When the pre-print confirmation process for dedicated print is initiated, the dedicated application 105 searches the dedicated hosts file 123 for an IP address and identification information corresponding to a node name stored in the dedicated node name variable (step S305). In step S310, the dedicated application 105 judges whether an IP address corresponding to the node name stored in the dedicated node name variable is found. If the node name is found (S310: YES), the dedicated application 105 executes PING (Packet Internet Groper) in which a request packet for a response is transmitted according to ICMP (Internet Control Message Protocol) for the searched IP address by unicast (step S315).

Then, the dedicated application 105 judges whether a response to the PING is received (step S320). If a response is received (S320: YES), the dedicated application 105 judges whether identification information stored in the response is identical with the identification information obtained in step S305 (step S325).

The fact that these pieces of identification information are identical with each other (S325: YES) corresponds to the fact that the dedicated application 105 has successfully checked that a device having the IP address searched from the dedicated hosts file 123 using the node name of the dedicated node name variable actually has identification information equal to the identification information associated with the IP address searched from the dedicated hosts file 123. In this case, it is considered that the name resolution can be performed appropriately by referring to the dedicated hosts file 123. Therefore, in this case, the pre-print confirmation process for dedicated print terminates (S325: YES).

If it is judged in step S310 that an IP address corresponding to the node name stored in the dedicated node name variable is not found in the dedicated hosts file 123 (S310: NO), a response to the PING has not been received (S320: NO), or the pieces of identification information are not identical with each other (S325: NO), it is considered that the name resolution can not be appropriately performed referring to the dedicated hosts file 123. Therefore, in this case, the following steps are performed so that the name resolution can be appropriately performed referring to the dedicated hosts file 123.

In step S330, the dedicated application 105 sends out a request for device information by SNMP broadcast or multicast. Then, the dedicated application 105 waits for a response from the printer 3 for a predetermined time (step S335). In step S330, a node name, an IP address, and identification information are requested as device information. If a response to the request is returned from a device (the printer 3), the dedicated application 105 receives the response in step S335. If two or more devices respond to the request, the dedicated application 105 receives two or more responses in the predetermined time.

Next, the dedicated application 105 judges whether a response from a target device is received (step S340). More specifically, in step S340, the dedicated application 105 searches the dedicated hosts file 123 for device information corresponding to the node name stored in the dedicated node name variable, and the dedicated application 105 judges that the response from the target device is received if a response is received from a device having identification information identical with identification information contained in the searched device information.

If a response is received from the target device (S340: YES), the dedicated application 105 writes the device information into the OS hosts file 115, and the general-purpose node variable is overwritten by the device information (step S345). Then, the dedicated application 105 writes the device information into the dedicated hosts file 123, and the dedicated node name variable is overwritten by the device information (step S350). Then, the pre-print confirmation process for dedicated print terminates.

In step S345, the node name and the IP address obtained in step S335 are written in the OS hosts file 115 as device information. In step S350, the node name, the IP address and the identification information obtained in step S335 are written in the dedicated hosts file 123 as device information. If a node name to be newly written into the hosts file 115 or 123 has been already registered in the hosts file 115 or 123, data corresponding to the node name to be newly written into the hosts file 115 or 123 is overwritten by new device information. With this configuration, the latest IP address information can be reflected in the hosts files 115 and 123 in a network environment where IP addresses are dynamically assigned to devices.

If it is judged in step S340 that a response from a target device is not received (S340. YES), the pre-print confirmation process for dedicated print terminates in an error state because in this case the dedicated application 105 failed to confirm the presence of the device having the node name stored in the dedicated node name variable.

After the pre-print confirmation process for dedicated print (step S210 in FIG. 7) is finished, control proceeds to step S215. If the pre-print confirmation process for dedicated print is finished normally, it is considered that the dedicated application 105 successfully confirmed the presence of the device having the node name stored in the dedicated node name variable. Therefore, in this case, the dedicated application 105 passes the print data to the dedicated data transmission unit 121, and the dedicated data transmission unit 121 executes a dedicated data transmission process (S215).

FIG. 9 is a flowchart illustrating the dedicated data transmission process. When the dedicated data transmission process is initiated, the dedicated data transmission unit 121 searches the dedicated hosts file 123 for an IP address corresponding to the node name stored in the dedicated node name variable (step S405). That is, the name resolution is performed by the dedicated data transmission unit 121 using the dedicated hosts file 123.

Then, the print data is transmitted to a device having the IP address obtained in step S405 (step S410). Then, the dedicated data transmission process terminates. With this configuration, the print data is transmitted from the PC 1 to the printer 3, and the printing operation for the print data is performed by the printer 3.

After the dedicated data transmission process is thus finished, the dedicated print process shown in FIG. 7 terminates.

As described above, if the printing operation is performed by the dedicated application 105, the name resolution is performed using the dedicated hosts file 123. Such a configuration eliminates the need for a dedicated device for performing the name resolution (e.g., a DNS server). The PC 1 is able to achieve the name resolution on a standalone basis.

The PC 1 checks whether the name resolution is appropriately performed using the device information registered in the dedicated hosts file 123 by unicast, and updates the dedicated hosts file 123 by broadcast or multicast only when there is a possibility that the name resolution is not appropriately performed. Therefore, if the name resolution can be performed appropriately using the device information registered in the dedicated hosts file 123, the PC 1 is able to prevent an excessive load from being put on the network by broadcast or multicast.

In step S325 of the pre-print confirmation process for dedicated print, the validity of the dedicated hosts file 123 is checked by checking the consistency between the pieces of identification information which the user is not able to rewrite easily. Therefore, the check of the validity of the dedicated hosts file can be achieved reliably in comparison with the case where the validity of the dedicated hosts file is checked by use of a node name which a user is able to rewrite relatively easily.

Hereafter, a normal print process performed by the normal print processing unit 111 and the general-purpose data transmission unit 113 is described with reference to FIGS. 10 to 12. The normal print process shown in FIGS. 10 to 12 is performed under cooperation between the normal print processing unit 111 and the general-purpose data transmission unit 113 when the general-purpose application 107 performs a print out process by calling a standard printing function of the OS 101.

Figure 10:
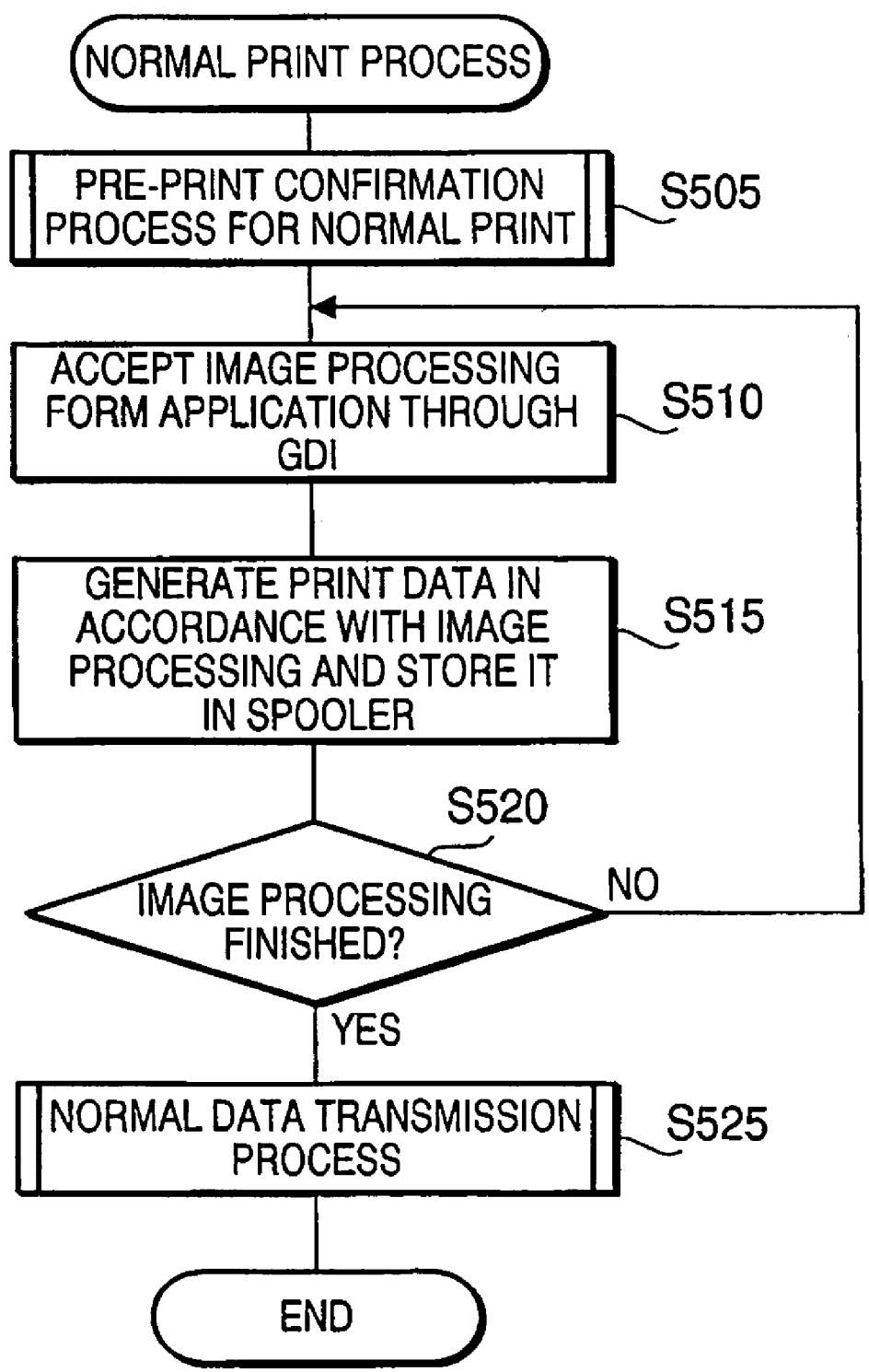
FIG. 10 is a flowchart illustrating a normal print process.

As shown in FIG. 10, when the normal print process is initiated, the normal print processing unit 111 executes a pre-print confirmation process for normal print.

Figure 11:
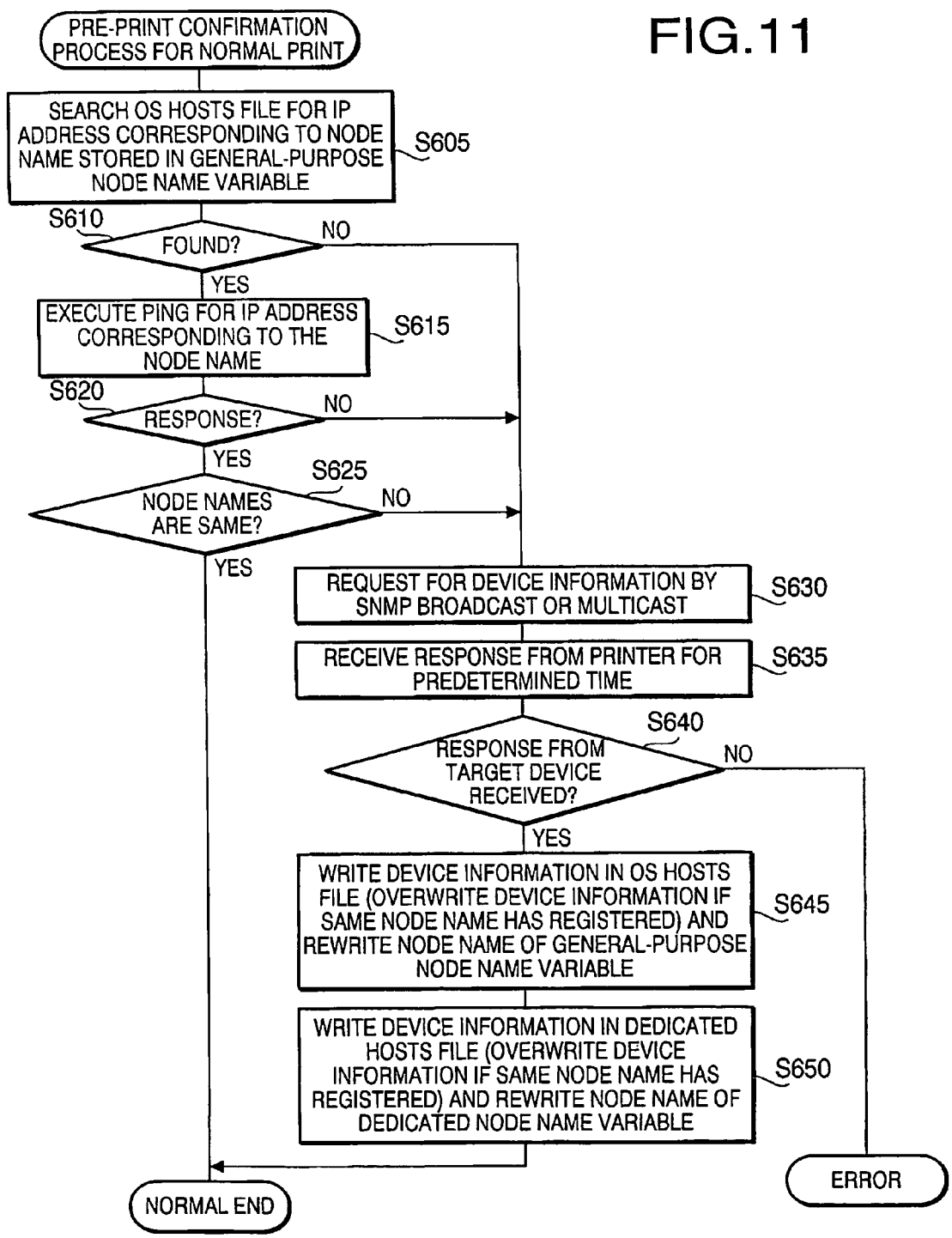
FIG. 11 is a flowchart illustrating a pre-print confirmation process for normal print.
Figure 12:
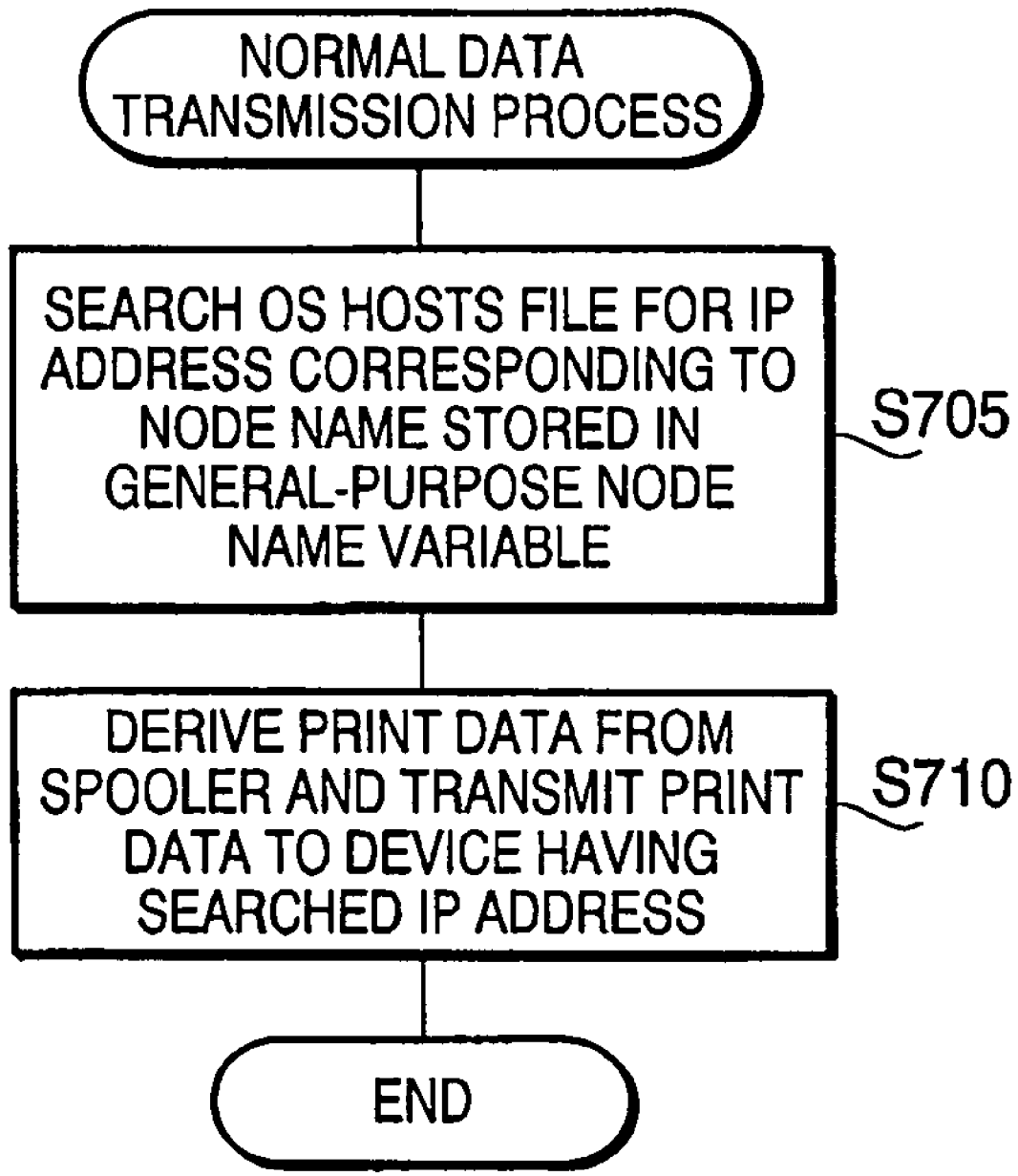
FIG. 12 is a flowchart illustrating a normal data transmission process.

FIG. 11 is a flowchart illustrating the pre-print confirmation process for normal print. When the pre-print confirmation process for normal print is initiated, the normal print processing unit 111 searches the OS hosts file 115 for an IP address corresponding to a node name stored in the general-purpose node name variable (step S605). In step S610, the normal print processing unit 111 judges whether an IP address corresponding to the node name stored in the general-purpose node name variable is found. If the node name is found (S610: YES), the normal print processing unit 111 executes PING for the searched IP address by unicast (step S615).

Then, the normal print processing unit 111 judges whether a response to the PING is received (step S620). If a response is received (S620: YES), the normal print processing unit 111 judges whether a node name stored in the response is identical with the node name obtained in step S605 (step S625).

The fact that these node names are identical with each other (S625: YES) corresponds to the fact that the normal print processing unit 111 has successfully checked that a device having the IP address searched from the OS hosts file 115 using the node name of the general-purpose node name variable actually has a node name equal to the node name associated with the IP address searched from the OS hosts file 115. In this case, it is considered that the name resolution can be performed appropriately by referring to the OS hosts file 115. Therefore, in this case, the pre-print confirmation process for normal print terminates (S625: YES).

If it is judged in step S610 that an IP address corresponding to the node name stored in the general-purpose node name variable is not found in the OS hosts file 115 (S610: NO), a response to the PING has not been received (S620: NO), or the node names are not identical with each other (S625: NO), it is considered that the name resolution can not be appropriately performed referring to the OS hosts file 115. Therefore, in this case, the following steps are performed so that the name resolution can be appropriately performed referring to the OS hosts file 115.

In step S630, the normal print processing unit 111 sends out a request for device information by SNMP broadcast or multicast. Then, the normal print processing unit 111 waits for a response from the printer 3 for a predetermined time (step S635). In step S630, a node name, an IP address, and identification information are requested as device information. If a response to the request is returned from a device (the printer 3), the normal print processing unit 111 receives the response in step S635. If two or more devices respond to the request, the normal print processing unit 111 receives two or more responses in the predetermined time.

Next, the normal print processing unit 111 judges whether a response from a target device is received (step S640). More specifically, in step S640, the normal print processing unit 111 searches the dedicated hosts file 123 for device information corresponding to the node name stored in the general-purpose node name variable, and then the normal print processing unit 111 judges that the response from the target device is received if a response is received from a device having identification information identical with identification information contained in the device information searched from the dedicated hosts file 123.

If a response is received from the target device (S640: YES), the normal print processing unit 111 writes the device information into the OS hosts file 115, and the general-purpose node variable is overwritten by the device information (step S645). Then, the normal print processing unit 111 writes the device information into the dedicated hosts file 123, and the dedicated node name variable is overwritten by the device information (step S650). Then, the pre-print confirmation process for normal print terminates.

In step S645, the node name and the IP address obtained in step S635 are written in the OS hosts file 115 as device information. In step S650, the node name, the IP address and the identification information obtained in step S635 are written in the dedicated hosts file 123 as device information. If a node name to be newly written into the hosts file 115 or 123 has been already registered in the hosts file 115 or 123, data corresponding to the node name to be newly written into the hosts file 115 or 123 is overwritten by new device information. With this configuration, the latest IP address information can be reflected in the hosts files 115 and 123 in a network environment where IP addresses are dynamically assigned to devices.

If it is judged in step S640 that a response from a target device is not received (S640:YES), the pre-print confirmation process for normal print terminates in an error state because in this case the normal print processing unit 111 failed to confirm the presence of the device having the node name stored in the general-purpose node name variable.

After the pre-print confirmation process for normal print is finished (step S505 in FIG. 10), control proceeds to step S515. If the pre-print confirmation process for normal print is finished in an error state, it is considered that the normal print processing unit 111 was not able to confirm the presence of the device having the node name stored in the general-purpose node variable. Therefore, in this case, the normal print process terminates without processing steps from S510.

If the pre-print confirmation process for normal print is finished normally, it is considered that the normal print processing unit 111 was able to confirm the presence of the device having the node name stored in the general-purpose node variable. Therefore, in this case, steps from S510 are processed.

In step S510, the normal print processing unit 111 accepts an image processing from the general-purpose application 107 via GDI (Graphic Device Interface) which is a software module prepared as a standard function of the OS 101 (e.g., Windows®). Through the GDI, an application program is able to display or print data without considering the detailed specifications of such a data output device.

When the normal print processing unit 111 accepts the image processing from the general-purpose application 107, the normal print processing unit 111 generates print data in accordance with the accepted image processing, and saves the print data into a spooler (step S515). Then, the normal print processing unit 111 judges whether the image processing through the GDI has finished (step S520). If the image processing has not been finished (S520: NO), the normal print processing unit 111 repeats the steps S510 and S5150.

If the image processing has been finished (S520:YES), the general-purpose data transmission unit 113 executes a normal data transmission process (step S525).

FIG. 12 is a flowchart illustrating the normal data transmission process. When the normal data transmission process is initiated, the general-purpose data transmission unit 113 searches the OS hosts file 115 for an IP address corresponding to the node name stored in the general-purpose node variable (step S705). That is, the general-purpose data transmission unit 113 performs the name resolution using the OS hosts file 115.

Then, the general-purpose data transmission unit 113 derives the print data from the spooler, and transmits the print data to the IP address obtained in step S705 (step S710). Then, the normal data transmission process terminates. With this configuration, the print data is transmitted from the PC 1 to the printer 3, and the printer 3 performs the printing operation for the print data. After step S710 is finished, the normal print process shown in FIG. 10 terminates.

As described above, if the printing operation is performed by the normal print processing unit 111, the name resolution is performed using the dedicated hosts file 123. Such a configuration eliminates the need for a dedicated device for performing the name resolution (e.g., a DNS server). The PC 1 is able to achieve the name resolution on a standalone basis.

The PC 1 checks whether the name resolution is appropriately performed using the device information registered in the OS hosts file 115 by unicast, and updates the OS hosts file 115 by broadcast or multicast only when there is a possibility that the name resolution is not appropriately performed using the OS hosts file 115. Therefore, if the name resolution can be performed appropriately using the device information registered in the OS hosts file 115, the PC 1 is able to prevent an excessive load from being put on the network by broadcast or multicast.

In step S625, the validity of the OS hosts file 115 is checked by judging the consistency between a node name in the general-purpose node name variable and a node name contained in the response. Therefore, it is possible to appropriately check the validity of the OS hosts file without recording identification information which the dedicated hosts file 123 stores.

Although the present invention has been described in considerable detail with reference to certain preferred embodiments thereof, other embodiments are possible.

In the above mentioned embodiment, the relationship between each node name and its corresponding IP address is stored in both the OS hosts file 115 and the dedicated hosts file 123. However, the relationship between each node name and its corresponding IP address can be stored only in the OS hosts file 115 because the general-purpose application 107 is able to perform the name resolution using the function of the OS 101 (i.e., using the OS hosts file 115). If the OS 101 has requirements that the OS hosts file should store only the relationship between a node name and an IP address, it is preferable to prepare a dedicated hosts file that is allowed to additionally store identification information.

In the above mentioned embodiment, a serial number of a device has been explained as an example of the identification information which the user is not able to easily rewrite. Other information such as a MAC address of a device may be used as the identification information. It is understood that such identification is considered as information which in general a user is not able to rewrite because a particular user operation is required to rewrite such identification information.

In the above mentioned embodiment, a node name or identification obtained from a response to a request designating an IP address is compared with a node name or identification information stored in the OS hosts file 115 or the dedicated hosts file 123 to check the validity of the IP address stored in the OS hosts file 115 or the dedicated hosts file 123. However, in a network environment where an IP address assigned to each device does not change dynamically and a node name assigned to each device does not change, it is possible to check the validity of the OS hosts file 115 or the dedicated hosts file 123 only by checking the presence or absence of a response to a request designating an IP address.

In the above mentioned embodiment, after requesting an IP address and a node name from nodes on a network by broadcast or multicast, only a node specified by a user and its corresponding IP address or a target node and its corresponding IP address is stored in the OS hosts file 115 or the dedicated hosts file 123. However, in a small size network where the number of nodes is relatively small, node names and IP addresses obtained from responses to a request (sent by broadcast or multicast) returned from all of the nodes on the network can be stored in the OS hosts file 115 and the dedicated hosts file 123.

What is claimed is:

1. A device connected to a network to which nodes are connected, the device comprising:
   a first storage unit in which information is registered;

a request unit to transmit a request for device information concerning a name and an address of a node to the nodes;

a reception unit to receive device information transmitted from the nodes as responses to the request;

a registration unit to register the device information received by the reception unit into the first storage unit;

a name resolution unit to perform name resolution by converting a requested node name to its corresponding IP address referring to the first storage unit, a checking unit to check whether a node having the IP address corresponding to the requested node name is actually found on the network when the name resolution unit performs the name resolution; and an update control unit to control the request unit and the reception unit to transmit the request, to receive the device information and to update the first storage unit with newly received device information if the node having the IP address corresponding to the requested node name is not found by the checking unit.

2. The device according to claim 1, wherein the checking unit transmits a request for a response to the IP address corresponding to the requested node name, and judges whether a node having the IP address corresponding to the requested node name is actually found on the network in accordance with presence or absence of a response to the request for response returned from the IP address corresponding to the requested node name.

3. The device according to claim 1, wherein the checking unit transmits a request for a response containing a node name to the IP address corresponding to the requested node name, and judges whether a node having the IP address corresponding to the requested node name is actually found on the network by judging whether a node name contained in a response to the request for a response returned from the IP address corresponding to the requested node name is identical to the requested node name.

4. The device according to claim 1, further comprising a second storage unit in which information is registered, wherein:

the checking unit transmits the request to obtain an IP address, a node name and identification information of each node as the device information;

the reception unit receives an IP address, a node name and identification information of each node as the device information;

the registration unit registers an IP address and a node name obtained from each node in the first storage unit, and registers an IP address, a node name and identification information obtained from each node in the second storage unit;

the checking unit transmits a request for a response containing a node name to the IP address corresponding to the requested node name, and judges that a node having the IP address corresponding to the requested node name is actually found on the network if a node name contained in a response to the request for a response returned from the IP address corresponding to the requested node name is identical with the requested node name, and identification information contained in the response returned from the IP address corresponding to the requested node name is identical with the identification information associated with the requested node name in the second storage unit; and the update control unit controls the request unit and the reception unit to transmit the request, to receive the device information and to update the second storage unit with the newly received IP address, node name and identification information of each node, in addition to updating the first storage unit, if the node having the IP address corresponding to the requested node name is not found by the checking unit.

5. The device according to claim 4, wherein the identification information is one of a MAC address and a serial number of each node.

* * * * *